United States Patent Office 3,264,606
Patented August 2, 1966

---

3,264,606
METHOD AND APPARATUS FOR CONTINUOUS WAVE SEISMIC PROSPECTING
Troy N. Crook and John D. Ball, Houston, and Charles L. Hubbard, Bellaire, Tex., assignors, by mesne assignments, to Esso Production Research Company, Houston, Tex., a corporation of Delaware
Filed Nov. 2, 1964, Ser. No. 408,310
17 Claims. (Cl. 340—15.5)

The present application is a continuation-in-part of application Serial No. 36,295, filed June 15, 1960 by Troy N. Crook, John D. Ball, and Charles L. Hubbard, entitled "Method and Apparatus for Continuous Wave Seismic Prospecting," now abandoned.

This invention relates to the art of seismic prospecting, and more particularly relates to seismic prospecting techniques wherein elongated wave trains of seismic signals are transmitted into the earth.

In the usual type of seismic prospecting, a relatively sharp pulse of elastic-wave energy is transmitted into the earth from a location at or near the earth's surface, and the resulting seismic waves are detected with geophones located at a plurality of detecting stations or locations spaced apart on the earth's surface. Electrical output signals from the geophones are simultaneously recorded to form a multiple-trace seismogram. The seismogram is examined and operated on in various ways to pick out reflected, refracted, and diffracted waves therein that are indicative of subsurface strata. In order to determine the depth of a given stratum, the two-way travel time of the seismic waves between the earth's surface and the stratum (as well as the velocity of the waves in the strata through which the waves travel) must be measured very exactly. In this method of seismic prospecting, all of the elastic wave energy is transmitted into the earth at substantially the same time, and elimination of undesired components of the traces of the seismograms may be by means of frequency discrimination.

In another type of seismic prospecting that has found relatively limited use, an elongated, more-or-less sinusoidal vibratory seismic signal is transmitted into the earth. The signal is continuously varied in frequency so as to be nonrepetitive in frequency during a time interval which is at least as long as twice the travel time of seismic waves from the earth's surface to the deepest seismic wave reflecting horizon of interest. Expressed in another manner, the duration of the signal is at least as long as the travel time of the signal along any of the paths by which it reaches a detecting location at usable energy levels. Seismic waves produced by the vibratory transmitted signal are detected at one or more detecting stations removed from the transmitting location. Also, a counterpart electrical signal of the transmitted signal is produced by a geophone at the transmitting location to pick out wave trains in each detected signal that were produced by the transmitted signal. The counterpart signal is correlated with each detected signal. Correlation is usually accomplished by an electrical correlating apparatus. The general method is described in U.S. Patent 2,688,124—W. E. N. Doty et al., and will be recognized as being of the type operating in the time domain.

Correlation between the counterpart electrical signal and an electrical signal representative of detected seismic waves may be accomplished by initially recording both signals, reproducing the signals as time series, combining the time series, emphasizing amplitude variations in the combined time series, integrating the resultng signal, and shifting the time-phase relation between the reproduced signals with respect to their time-phase relation as originally recorded. The time-phase relationship which yields the greatest value of the integrated signal is a parameter of the travel time of a given reflected event on the recorded detected signal.

The accuracy with which the travel time of seismic waves from the transmitting location to a given reflecting horizon and then to the detecting location may be determined is dependent to a large extent on the shape of the correlation curve obtained by the above process. The correlation curve obtained in a seismic observation when a vibratory, substantially sinusoidal signal of continuously varying frequency is transmitted into the ground, as described in Patent 2,688,124, comprises a major lobe flanked by minor lobes diminishing in amplitude and extending from the major lobe in both directions on the time-shift, or $\tau$, axis of the correlation curve. The side lobes of the correlation curve will be found to vary in amplitude as a function of the rate of change of frequency of the transmitted seismic signal. The side lobes of the correlation curve produced by reflections from a good reflecting horizon may be of sufficient amplitude to mask all of the lobes of a small amplitude correlation signal resulting from reflection from a relatively poor reflecting horizon located near the good reflecting horizon. Also, there is a strong probability that the side lobe of the correlation signal indicative of one reflection may be mistaken for the central lobe of the correlation signal indicative of another reflection. Manifestly, it is desirable to reduce the amplitude of side lobes from correlation curves obtained utilizing the so-called continuous wave correlation process. Preferably, the side lobes should be eliminated.

Additionally, in connection with seismic prospecting and also in connection with seismic velocity logging of boreholes, there exists a need for a system of determining the one-way travel time of seismic waves between the earth's surface and any depth in a borehole wherein a nonexplosive seismic wave source is utilized. While the apparatus described in U.S. Patent 2,688,124 may be used for this purpose by lowering the detecting station geophone into the borehole, the apparatus, when used in this manner, does not produce precise results because of the high amplitude side lobes in the auto-correlation characteristic, and because the auto-correlation lobes are quite broad. Furthermore, the apparatus is bulky, heavy, and cumbersome, is subject to mechanical failure, and thus is not well adapted for field use.

Before proceeding with a description of the present invention, it is advisable to define and discuss certain terms that will be used in the following description and claims.

The term "shift register or null sequence binary code of maximal length" signifies a binary code which may be represented as a reference time series, which code is formed by operating on a binary code group of N digits according to a predetermined rule of formation such that the code group will not repeat itself before $2^N-1$ digits. Expressed in another manner, a binary code of maximal length is a binary code wherein a binary group of N digits at the beginning thereof is not repeated until the code has at least $2^N-1$ digits therein. For example, if the five element code group 01101 is used, N will be equal to 5 and $2^N-1$ equals 31. A shift register binary code of maximal length can be formed therefrom by starting off with the five element code group 01101 and setting the next element equal to the sum modulo 2 of the first, second, third, and fifth digits preceding it; this results in the six element code group 011010. This process is repeated with the resulting code group 011010, again setting the next element equal to the sum modulo 2 of the first, second, third, and fifth digits preceding it to form the seven element code group 0110100. The process is repetitively repeated to form each successive element, and the following code is obtained before any five element code group is repeated:

0110100001100100111110111000101

By applying the above-specified rule of formation, it will be found that after 31 elements, the sequence will repeat. For a more complete discussion of shift register or null sequence code of maximal length, reference may be had to the following: "The Synthesis of Linear Sequential Coding Networks," by D. A. Huffman, Proc. Third London Symposium on Information Theory, September 1955; and "Several Binary-Sequence Generators" by N. Zierler, Tech Rep. 95, Lincoln Laboratroy, Massachusetts Institute of Technology, Cambridge, Massachusetts, September 1955.

The term "amplitude density spectrum" of a signal refers to the relationship between the amplitude of each frequency component of the signal as a function of frequency for all frequencies contained in the signal.

The present invention is similar to conventional continuous wave prospecting techniques in that it contemplates determining the travel times of a seismic signal between a transmitting location and a receiving location via one or more ray of travel paths. The invention contemplates that many reflection components of the composited detected signal (as opposed to random or "noise" components) have an amplitude density spectrum such that the auto-correlation function thereof is defined by substantially a single unique lobe having no side lobes of larger amplitude than lobes obtained by auto-correlating any statistically unassociated random noise signals having the same frequency limits as the reflection components of the composited detected signal and of the same time duration as the reflection components of the composited detected signal. In explanation of the immediately preceding statement, it is to be noted that a certain amount of cross-correlation will be obtained between any pair of wave trains no matter how irregular or random they may be in amplitude, phase, and frequency. However, any statistically unassociated pair of noise signals (i.e., chosen at random and having no statistical interrelationship) will, in general, exhibit no autocorrelating side lobes of greater than a particular amplitude. As an example, it has been found that a noise signal of ten seconds duration having an amplitude spectrum that is flat from 10 to 40 cycles per second will have auto-correlation side lobes, 95 percent of which fall below 10 percent of the height of the central lobe. Both in the present invention and in conventional continuous wave prospecting systems there is transmitted into the earth a vibratory signal made up of a succession of energy pulses which, after propagation along a plurality of travel paths, is detected as a composite signal at the detecting locations; the transmitted signal is nonrepetitive during a time interval which is substantially longer than the travel time of the signal along the longest travel path of interest. In the usual case in reflection seismographing, the longest travel path of interest will be the shortest path from the seismic wave source to the deepest reflecting horizon which it is desired to delineate and back to the earth's surface at the detecting location farthest removed from the semismic source. Both in the present invention and in conventional continuous wave prospecting systems, preferably there is produced at the transmitting location an electrical signal representative of the transmitted signal which preferably is an electrical counterpart signal or replica of the transmitted signal, this signal is recorded along with the detected signals, and both signals are reproduced and are correlated while shifting the time-phase relation thereof with respect to their time-phase relations as originally recorded. A particularly satisfactory way in which such a single, unique correlation lobe may be obtained is to shape the seismic signal transmitted into the earth so that the amplitude density spectrum of the wave train is given by the formula $$\frac{\operatorname{Sin} X}{X}$$

where X represents frequency over a preselected frequency spectrum (e.g. 10 to 1000 c.p.s. a band that is propagated through the earth with attenuation that can be tolerated). According to a more specific aspect of the invention, the seismic signal is formed according to a shift register binary code of maximal length. Transmitting a shift register binary code of maximal length into the earth in the form of a seismic signal presupposes that a characteristic of the seismic signal has two distinct conditions. For example, the amplitude may be varied between two magnitudes or the phase may be varied between two phase relationships. In a preferred embodiment of the invention, the transmitted signal is made from a constant frequency sinusoidal signal of constant amplitude, the phase of which is varied between mutually opposite phase relationships in accordance with a shift register binary code of maximal length having a duration at least equal to twice the travel time of seismic waves between the earth's surface and the deepest earth reflecting horizon of interest.

At this point, it is to be noted that the attenuation suffered by seismic waves traveling through the earth varies with the frequency of the waves. Furthermore, the attenuation characteristic of the earth varies from location to location. For this reason the wave shape of any signal transmitted into the earth made up of a number of frequency components will be distorted to some extent, particularly if the band of frequencies which are composited to make the transmitted signal is extremly broad. It has been found, however, that usually the distortion will be tolerable for signals having components in the band of 10 to 1000 c.p.s.

The invention will be explained in greater detail with reference to the accompanying drawings, wherein.

Figure 1:
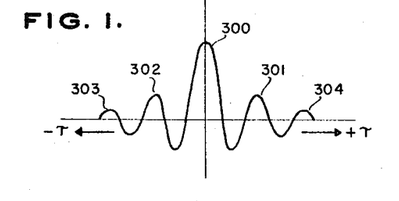
FIG. 1 is a representation of a cross-correlation curve for a particular reflection event on a seismogram obtained when the continuous wave seismic prospecting technique is utilized.

With reference now to the prior art correlation curve shown in FIG. 1, it is to be observed that the correlation curve comprises a major central lobe 300 flanked by minor lobes designated by the reference numerals 301, 302, 303, and 304, which are of diminishing amplitude.

Figure 2:
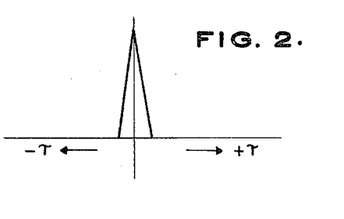
FIG. 2 is a representation of the shape of an ideal cross-correlation curve for a particular reflection event on a seismogram that may be considered to be the goal of an ideal continuous wave prospecting system.

As the time-phase relationship, or $\tau$, between the counterpart signal and the composite detected signal is varied, a desirable correlation curve would have substantially the shape shown in FIG. 2 and would comprise a single or unique sharp spike or lobe having a substantially linear rise and fall from zero correlation. The spike should be as narrow and as pointed as possible; in practice, a sharp point is almost impossible to obtain, so the term "lobe" is more descriptive of the curve that will actually be obtained. "$\tau$" is used in the present discussion to designate the magnitude of time-phase shift from that time-phase relationship which produces maximum correlation between correlated signals. It is manifest that the prior art correlation curve of FIG. 1 severely limits the utility of the continuous wave prospecting technique. The present invention is directed to producing a correlation curve more nearly in accordance with the curve shown in FIG. 2.

Figures 3, 4, 5:
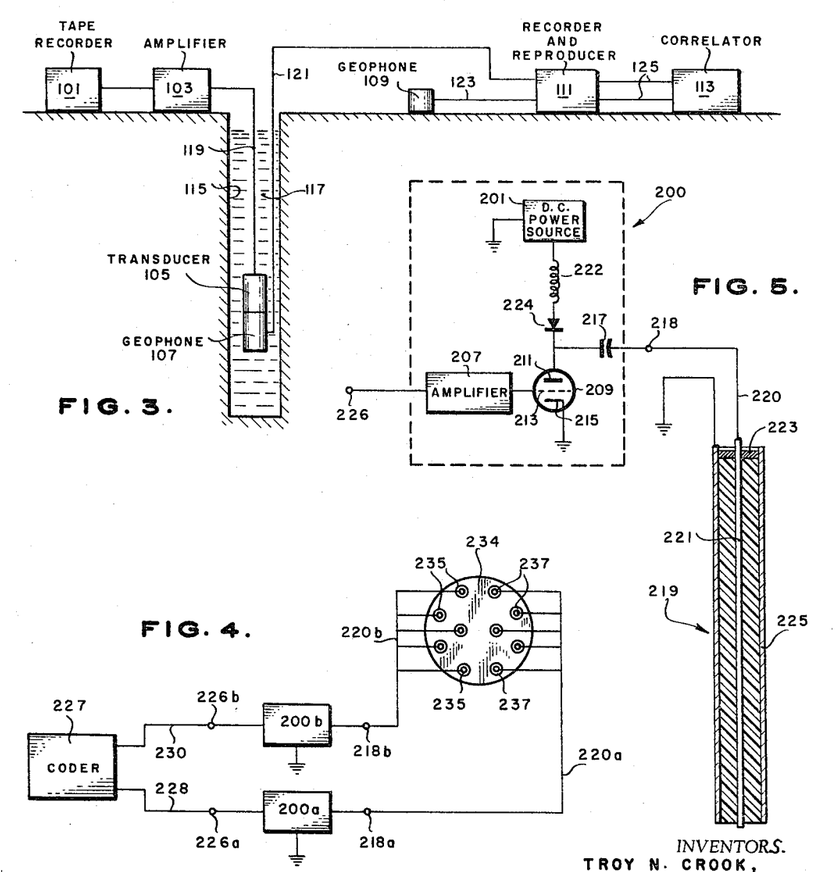
FIG. 3 is a schematic representation of seismic wave prospecting apparatus in accordance with the teachings of the present invention.
FIGS. 4 and 5 show in schematic diagram form another type of apparatus that may be used to produce seismic waves in accordance with the teachings of the present invention.

FIG. 3 illustrates one type of apparatus that may be used for practicing the present invention. There is shown transducer 105 and a geophone 107 in a borehole 115 in the earth, coupled to the earth by a fluid medium 117 in the borehole. The transducer 105 may be any of a number of electroacoustic transducers known to the prior art, such as, for example, a magnetostrictive or electrostrictive barium titinate device, or a loud-speaker type of transducer adapted to faithfully reproduce signals of seismic frequency (preferably in the range of 10 to 500 c.p.s.). The geophone 107 is in close proximity to the transducer 105 so as to produce a counterpart electrical signal of the compressional or elastic wave signals generated by the transducer. The transducer 105 is energized by electrical signals which may be produced from a tape recorder 101 and amplified to usable signal levels by a conventional electronic amplifier 103. The output signal of the tape recorder 101 will be discussed below.

A plurality of geophones or geophone arrays are located at detecting locations in the usual manner. By the term "geophone arrays" is meant a plurality of geophones arranged in a predetermined pattern, such as a star, and electrically interconnected so as to be most sensitive to substantially vertically-traveling seismic waves and to discriminate against other seismic waves. This technique is well known to the art and will not be further discussed herein. In the drawing, only a single geophone 109 is shown for the purpose of not cluttering the drawing with unnecessary detail. It is to be understood, however, that the drawing is illustrative only, and that in accordance with the usual practice, a multiplicity of detecting stations will be utilized. It is further to be understood that geophone 109 is to be taken as indicative of a single geophone station and that a multiplicity of geophones in an array may be utilized at the detecting station as discussed above.

The output signals of geophone 107 and geophone 109 are coupled to a recorder 111 by electrical leads 121 and 123, respectively. The recorder 111 is adapted to reproducibly record electrical signals coupled thereto and is further adapted to vary the time-phase relationship between the reproduced signals. The recorder 111 may be a conventional tape recorder for recording a multiplicity of geophone output signals such as is manufactured by the Ampex Corporation of Los Angeles, California. Reproduced output signals from the tape recorder appear on lines 125 and are applied to an electrical correlating apparatus 113. The electrical correlating apparatus may be any of a number of devices known to the prior art. In a preferred type of correlating device, the electrical signals are applied to a summing circuit and are summed therein, the summed signal is squared to emphasize amplitude variations thereof, and the resulting signal is integrated. This type of apparatus is described in U.S. Patent 2,927,656 and will not be further discussed herein.

Figure 6:
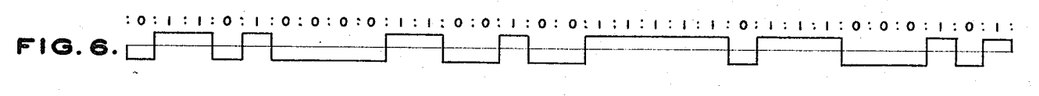
FIGS. 6 and 7 are wave shapes of seismic wave pulses which are useful in understanding the significance of the present invention.
Figure 7:
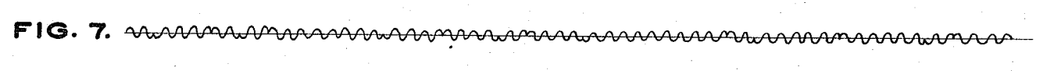

The output signal from tape recorder 101 for use with the embodiment of FIG. 3 may be as shown in FIG. 6 or in FIG. 7. In FIG. 6 there is shown a pulse train of square wave signals which represent the shift register binary code of maximal length set forth above. An output signal that has been found to be particularly satisfactory is shown in FIG. 7. This signal also is indicative of the shift register binary code of maximal length set forth above. The term "0" is represented by one phase relationship, and the term "1" is represented by the opposite phase relationship. In FIG. 6 the term "0" is represented by a signal of one polarity, while the term "1" is represented by a signal of opposite polarity. The portions of the time axis of the figures representative of "0" and "1" are indicated in FIG. 6.

In FIGS. 4 and 5 there is shown apparatus for generating seismic waves in accordance with the present invention, wherein the amplitude density spectrum of a vibratory seismic wave train is shaped by varying the amplitude of the seismic wave train between zero amplitude and any predetermined amplitude. The apparatus makes use of a spark tube type of seismic wave source 219 which is best illustrated in FIG. 5. The spark tube 219 comprises a substantially tubular outer electrode 225 enclosing an inner rod or wire electrode 221. Outer electrode 225 may be made of copper, brass, or other electrically conductive metal. Wire electrode 221 may be of tungsten. Wire electrode 221 enters the outer electrode 225 at one end thereof through an electrically insulative cap or end piece 223. The space between electrodes 221 and 225 is filled with Teflon or other insulative material so that the two electrodes 221 and 225 are held in uniformly spaced-apart relationship.

Electrical energy for discharge between the lower end of the electrodes 221 and 225 is supplied from circuit 200 which includes a capacitor 217. The capacitor 217 is connected to an output terminal 218 of circuit 200 which, in turn, is connected to the wire electrode 221 by means of electrical lead 220. The outer electrode 225 is grounded. A D.C. power source 201 is connected between the other terminal of capacitor 217 and ground by means of series-connected inductor 222 and half wave recitfier 224. A discharge path for discharging the capacitor through the spark tube 219 is provided by thyratron 209. The anode 211 of thyratron 209 is connected to the capacitor 217 and half wave rectifier 224, and the thyratron cathode 215 is connected to ground. The control electrode 213 is connected to an input terminal 226 of circuit 200 by means of a suitable amplifier 207.

The operation of the apparatus shown in FIG. 5 is as follows. Let it be assumed that the lower end of the spark tube 219 is placed in a suitable electrically conductive liquid, such as salt water in a borehole. Initially, capacitor 217 will be charged from D.C. power source 201 through inductor 222, half wave rectifier 224, and through the electrically conductive liquid into which the lower end of the spark tube is immersed. The waveform of the charging current will be oscillatory because inductor 222 and capacitor 217 are in series circuit relationship. At the peak of the oscillatory charging cycle the current will drop to zero inasmuch as it will be blocked by half wave rectifier 224. Thus, the capacitor 217 will be charged to a substantially higher voltage than the voltage of the D.C. power source 201.

A positive triggering pulse may now be applied to control electrode 213 from a suitable trigger source connected to terminal 226. The triggering pulse applied to control electrode 213 will render control electrode 213 positive with respect to cathode 215 so that the thyratron 209 will conduct. Capacitor 217 will spark discharge through the thyratron 209 and electrically conductive liquid within which the lower end of spark tube 219 is immersed. When the voltage across capacitor 217 is of a sufficiently low value, thyratron 209 will stop conducting and the capacitor will again charge as described above.

An inspection of the shift register binary code of maximal length illustrated above will show that the same digit is consecutively repeated from time to time. When such a code is expressed in the form of a seismic wave wherein the amplitude is varied between two states, this means that the amplitude of the seismic wave must be maintained in one state for a time interval equal to a multiple of a shorter time interval. As applied to the apparatus shown in FIG. 5, this means that a multiplicity of such apparatus must be sequentially actuated (or not actuated) to generate a seismic wave of the desired wave shape.

In FIG. 4 there is shown two banks of spark tubes 235 and 237 which are constructed as shown in FIG. 5. The banks of spark tubes 235 and 237 are shown as being distributed in arrays over an area 234 of the earth's surface. The wire electrodes of the spark tubes 237 are connected together and are connected to an output terminal 218a by means of electrical lead 220a; similarly, the wire electrodes of spark tubes 235 are connected together and are connected to terminal 218b by electrical conductor 220b. The outer electrodes of all of the spark tubes 235 and 237 are grounded. Control circuits 200a and 200b, respectively, connect input terminals 226a and 226b to output terminals 218a and 218b. It is to be noted that all of the components designated by reference numerals having suffixes "a" and "b" are identical to the corresponding apparatuses of FIG. 5 having the same reference numerals.

Figure 8A:
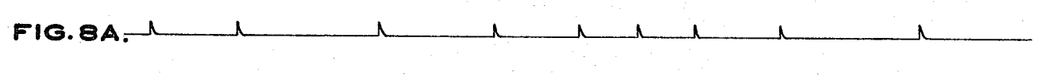
FIGS. 8A and 8B are representations of the wave shape of actuating pulses derived from the output of the components of the apparatus of FIG. 4, which is useful in understanding the operation of the apparatus of FIG. 4.
Figure 8B:
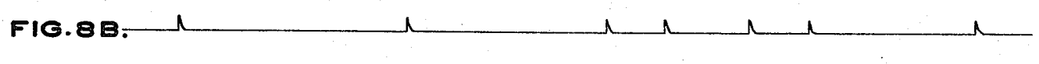
Figure 9:
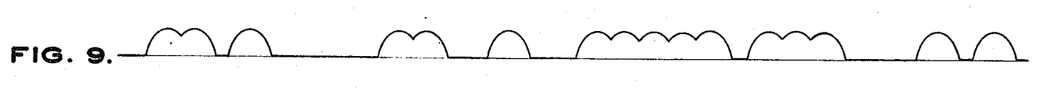
FIG. 9 is the wave shape of pulses that may be obtained from the apparatus of FIGS. 4 and 5 in accordance with the teachings of the invention.

A coder 227 is provided having a pair of output circuits which are respectively connected to terminals 226a and 226b by electrical leads 228 and 230. The coder 227 may be a two-channel magnetic tape recording and reproducing machine. The magnetic tape will have been prerecorded so that pulses appear on electrical leads 228 and 230 in a time sequence that will render the thyratrons in the circuits 200a and 200b conductive according to a time sequence determined by the shift register binary code of maximal length to be generated and transmitted into the ground. For example, in FIG. 8A there is shown a wave train of pulses that may appear on electrical leads 228, and in FIG. 8B there is shown a wave train of pulses that may appear on electrical lead 230 for the purpose of actuating the apparatus of FIG. 4 to produce seismic wave pulses having the waveform shown in FIG. 9. A pulse applied to terminal 226a will discharge the capacitor in circuit 200a through the spark tubes 237, and the pulses applied to terminal 226b through electrical lead 230 will discharge the capacitor in circuit 200b through the spark tubes 235. The seismic wave pulses applied to the ground by the apparatus shown in FIG. 4 will not have the idealized wave shape shown in FIG. 6, but will more nearly approximate the waveform shown in FIG. 9. However, it will be found that when the apparatus of FIG. 4 is actuated in accordance with a 1023 digit shift register binary code of maximal length, there will result a seismic wave train having an auto-correlation characteristic comprising a single major lobe with side lobules having a maximum amplitude less than one percent of the amplitude of the major lobe. In practice, it will be found that the amplitude of these minor lobules will be less than the amplitude of any lobe in the cross-correlation function of statistically unrelated noise components on seismograms produced during seismic observations in accordance with the teachings of the invention.

Other seismic sources may be used, such as an array of blasting caps or a plurality of sequentially actuated gas guns.

Figure 10A:
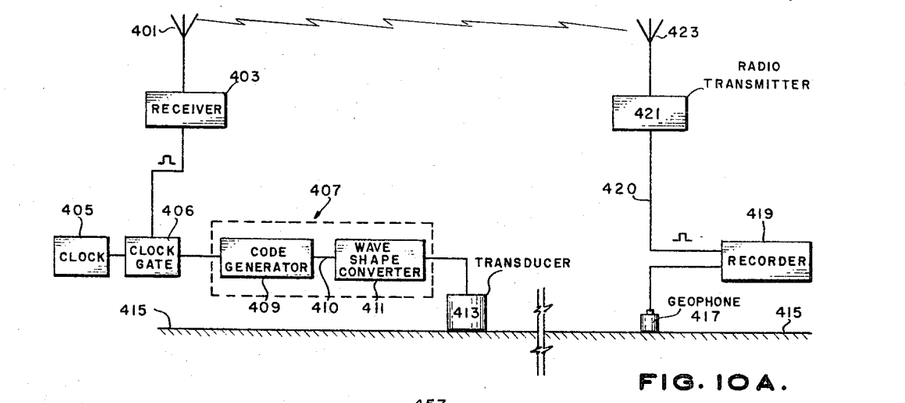
FIGS. 10A and 10B, taken together, are schematic diagrams, partially in block form, of another embodiment of the invention.
Figure 10B:
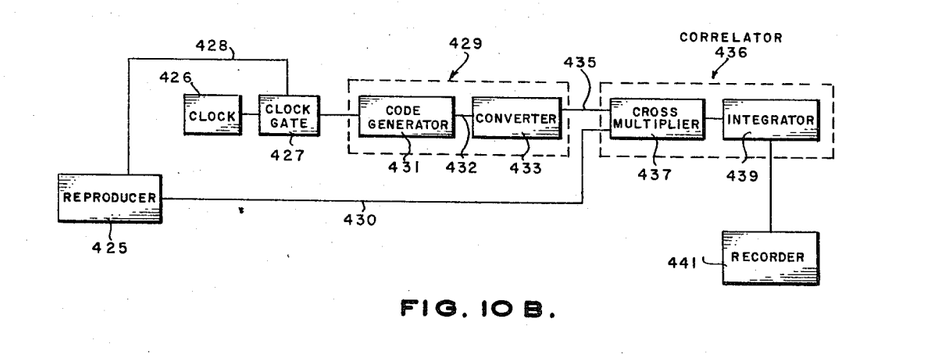
Figure 10C:
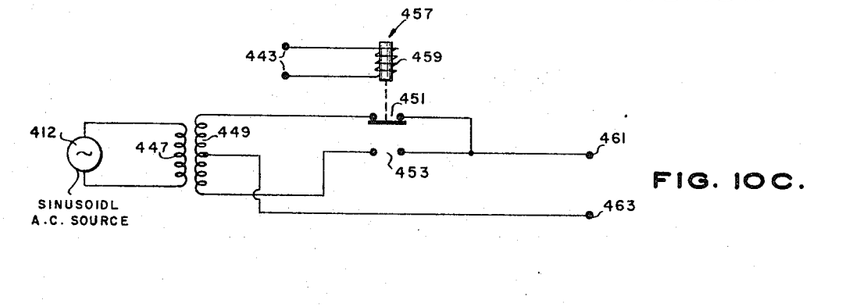
FIG. 10C is an electrical schematic diagram of apparatus suitable for use as wave shape converters in the apparatus of FIGS. 10A and 10B.

With reference now to FIGS. 10A, 10B, and 10C, there is shown another embodiment of the invention which is particularly adapted for use in rough terrain or where a considerable distance separates the transmitting location from the detecting location. Under these conditions it is desirable to activate the seismic source by means of a radio link so as to eliminate wires between the transmitting location and the receiving location. At the detecting location there is positioned a geophone 417 on the earth's surface 415 connected to a seismic recorder in the usual manner. The seismic recorder may be of the conventional type mentioned above, using magnetic tape as the recording medium, and includes means for producing an electrical impulse at the beginning of a seismic observation recording interval. The electrical impulse is usually produced by a cam-actuated switch on the recording drum and is usually for the purpose of closing an electrical connection for the purpose of detonating a seismic charge. The impulse is recorded on a separate trace by the recorder, and is concomitantly transmitted to the seismic wave transmitting location by means of a radio link including radio transmitter 421, transmitting antenna 423, receiving antenna 401, and radio receiver 403. The output of the receiver 403 will be a pulse having substantially the same waveform as that produced by recorder 419 on output lead 420 thereof.

At the seismic wave transmitting location, in addition to radio receiver 403 and antenna 401, there is located an electronic clock 405, a clock gate 406, a transducer 413 for converting electrical signals to seismic waves (sometimes termed an electro-acoustic tranducer) and electrical circuit means 407 for producing an electrical signal having a characteristic variable between two conditions in accordance with a code sequence having a unique auto-correlation function comprising a single major lobe having no side lobes of greater amplitude than the side lobes of the auto correlation function of statistically unrelated noise components of the composite signal detected at the detecting location, as discussed above. Furthermore, the reference electrical signal produced by electrical circuit means 407 is formed in accordance with a binary code sequence such that the reference electrical signal has an amplitude density spectrum given by the relationship $$\frac{\operatorname{Sin} X}{X}$$

where X is frequency, and more preferably it is formed in accordance with a binary code of maximal length.

The electrical circuit means 407 preferably comprises a code generator 409 for producing a binary code of maximal length which may be of several types well known to the prior art such as that illustrated in U.S. Patent 2,951,230. The output of such a code generator is usually in the form of electrical pulses having a rectangular waveform. The code generator 409 is coupled to a wave shape converter 411 for the purpose of converting the rectangular waveform output of the code generator to a form more suitable for seismic purposes. Apparatus suitable for inclusion in the shape converter 411 is illustrated in FIG. 10C and will be discussed below. Suffice to say at the moment that this apparatus preferably is adapted to vary a sinusoidal or cosinusoidal signal between two conditions in accordance with the amplitude levels of the rectangular wave output of the code generator 409 so that a signal having the general waveform shown in FIG. 7 is produced. Shift pulses for the code generator 409 are derived from electronic clock 405 through the electrical gate 406. The output signal of clock 405 may be either sinusoidal, spike or rectangular-wave, or pulsed, in accordance with the shift pulse requirements of code generator 409. The electronic gate 406 is of any of a number of types well known to the prior art adapted to gate the clock signals from clock 405 to code generator 409 upon reception of a pulse from radio receiver 403. The electro-acoustic transducer 413 may be of the loudspeaker type, as discussed above, or a vibrator adapted to convert electrical signals to seismic waves through a hydraulic amplifier driving a vibratory plate. Apparatus of the latter type is manufactured by Vard Manufacturing Company of Los Angeles, California; by the MB Electronics Company of New Haven, Connecticut; and by the Ling Electronics Company of Anaheim, California.

The converter apparatus 411, as illustrated in FIG. 10C, may comprise a sinusoidal alternation current source 412 of good frequency stability coupled to output terminals 461, 463, through a transformer comprising primary winding 447, and center-tapped secondary winding 449, and the contacts 451, 453 of relay 457. The center tap of secondary winding 449 is connected to output terminal 463. One side of the secondary winding 449 is connected to terminal 461 through contact 451, and the other side of the winding is connected to terminal 461 through contact 453. The relay 457 has an actuating winding 459 which is connected to the output lead 410 from code generator 409 so that contact 451 is normally closed with no signal applied thereto, but is actuated to close contact 453 when a signal of given amplitude appears at terminals 443. Thus, the signal appearing at terminals 461, 463 will shift between opposite phases of the sinusoidal signal produced by source 412 in accordance with the pulses appearing at terminals 443.

The operation of the apparatus is as follows. At the beginning of a recording interval, recorder 419 will produce a pulse on line 420 which is transmitted via the radio commnuications link to electronic gate 406. The shift signals from electronic clock 405 are coupled to the circuit 407 so that a signal variable between opposite phase relationships in accordance with the code produced by code generator 409 drives the electro-acoustic transducer 413. Electro-acoustic transducer 413 transmits seismic waves into the earth which are detected by geophone 417 and recorded in reproducible form by recorder 419. It is to be noted that no signal representative of the signal transmitted into the earth by transducer 413 is produced or recorded.

Apparatus for correlating the recorded signals produced in accordance with the technique described above is illustrated in FIG. 10B. Clock 426, electronic gate 427, code generator 431, and conversion circuit 433 are exactly the same as the clock 405, electronic gate 406, code generator 409, and converter circuit 411 of FIG. 10A, so that the output signal appearing on line 435 produced by converter circuit 433 has exactly or substantially the same waveform as the output signal produced by converter circuit 411. Reproducer 425 is of any type well known to the prior art for reproducing electrical signals recorded by a magnetic tape recorder 419. The reproducer should have adjustable reproducing heads so that the time relationship between the output signals may be readily adjusted. The output signal appearing on line 428 will be the output pulse recorded on the time axis of the magnetic recording medium at the instant at which the pulse appearing on line 420 is produced. Lead 428 is coupled to the electronic gate 427 so as to gate the clock signals produced by clock 420 to the code generator 431. The signals appearing on line 430 will be the reproduced geophone signals produced by geophone 417. The output signals from the electrical circuit 429 and the signals appearing on line 430 are coupled to an electrical correlator 436 comprising a cross-multiplier 437 and an integrator or averaging circuit 439. Other types of correlating circuits may be used, such as those making use of digital techniques or those where signals are added together, squared and averaged. The output signals from the integrator 439 are recorded in visual form by a recorder 441.

It should be noted that the same apparatus may be used as clocks, clock gates, code generators and wave shape converters in the apparatuses of FIGS. 10A and 10B.

The signal appearing on line 435, which may be termed a reference electrical signal, is representative of the seismic signal produced by transducer 413. This signal is repetitively reproduced along with the composite electrical signal from geophone 417 that is reproduced by recorder 425. The positions of the recording heads of the recorder 425 are varied after each reproduction cycle so that the correlator apparatus 436 electrically correlates the repetitively reproduced reference electrical signal on line 435 with the repetitively reproduced composite electrical signal on line 430 at each of a plurality of time-phase relationships therebetween.

The invention is not to be restricted to the special structural details, arrangement of parts, or circuit connections herein set forth, as various modifications thereof may be effected without departing from the spirit and scope of this invention.

What is claimed is:

1. In a method of determining the travel time of seismic waves between a transmitting location and a receiving location wherein there is transmitted from the transmitting location an elongated vibratory signal made up of a succession of seismic energy pulses which are transmitted through one or more ray paths through the earth from the transmitting location to the receiving location, which vibratory signal is nonrepetitive during a time interval which is at least as long as the travel time of the signal along any of said ray paths, and wherein there are produced time series respectively representative of the transmitted vibratory signal and the composite signal detected at the detecting location, and wherein the time series are cross-correlated while shifting the time-phase relationship thereof with respect to the time-phase relationship of the transmitted vibratory signal and the detected composite signal, the improvement which comprises:

producing a code sequence which may be represented as a reference time series having a unique auto-correlation function which comprises a single major lobe having no side lobes of greater amplitude than the side lobes of the auto-correlation function of statistically unrelated noise components of the composite signal detected at said detecting location; and shaping the amplitude density spectrum of the portion of the time series produced by the vibratory seismic waves traveling from said transmitting location to said receiving location along one of said one or more ray paths and the time series representative of the transmitted vibratory signal in an identical manner to correspond to said code sequence.

2. In a method of determining the travel time of seismic waves between a transmitting location and a receiving location wherein there is transmitted from the transmitting location an elongated vibratory signal made up of a succession of seismic energy pulses which are transmitted through one or more ray paths through the earth from the transmitting location to the receiving location, which vibratory signal is nonrepetitive during a time interval which is at least as long as the travel time of the signal along any of said ray paths, and wherein there are produced time series respectively representative of the transmitted vibratory signal and the composite signal detected at the detecting location, and wherein the time series are cross-correlated while shifting the time-phase relationship thereof with respect to the time-phase relationship of the transmitted vibratory signal and the detected composite signal, the improvement which comprises:

producing a code sequence which may be represented as a reference time series having a unique auto-correlation function comprising a single major lobe having no side lobes of greater amplitude than the side lobes of the auto-correlation function of statistically unrelated noise components of the composite signal detected at said detecting location; and shaping the amplitude density spectrum of the portion of the time series produced by the vibratory seismic waves traveling from said transmitting location to said receiving location along one of said one or more ray paths to correspond to said code sequence.

3. In a method for determining the travel time of a signal between a transmitting location and a detecting location spaced apart at the earth's surface wherein there is transmitted from the transmitting location a vibratory transmitted signal made up of a succession of energy pulses which, after propagation over a plurality of paths, is detected as a composite signal at the detecting location, which transmitted signal is nonrepetitive during a time interval which is at least as long as the travel time of said signal along any of said paths by which it reaches the detecting location at usable energy levels and wherein there are produced a time series representative of said transmitted signal and a time series representative of the composite signal detected at the detecting location, and the time series are then cross-correlated while shifting the time-phase relationship thereof with respect to the time-phase relationship of the transmitted signal and the composite detected signal, the improvement which comprises:

producing a shift register binary code of maximal length; and varying a characteristic of said vibratory signal in accordance with said shift register binary code of maximal length.

4. In a method for determining the travel time of a signal between a transmitting location and a detecting location spaced apart at the earth's surface wherein there is transmitted from the transmitting location a vibratory transmitted signal made up of a succession of energy pulses which, after propagation over a plurality of paths, is detected as a composite signal at the detecting location, which transmitted signal is nonrepetitive during a time interval which is at least as long as the travel time of said signal along any of said paths by which it reaches the detecting location at usable energy levels and wherein there are produced a time series representative of said transmitted signal and a time series representative of the composite signal detected at the detecting location, and the time series are then cross-correlated while shifting the time-phase relationship thereof with respect to the time-phase relationship of the transmitted signal and the composite detected signal, the improvement which comprises:

producing said vibratory signal in the form of a signal having a characteristic adapted to vary between two magnitudes; and varying said characteristic between said two magnitudes according to a shift register binary code of maximal length.

5. In a method for determining the travel time of a signal between a transmitting location and a detecting location spaced apart at the earth's surface wherein there is transmitted from the transmitting location a vibratory transmitted signal made up of a succession of energy pulses which, after propagation over a plurality of paths, is detected as a composite signal at the detecting location, which transmitted signal is nonrepetitive during a time interval which is at least as long as the travel time of said signal along any of said paths by which it reaches the detecting location at usable energy levels and wherein there are produced a time series representative of said transmitted signal and a time series representative of the composite signal detected at the detecting location, and the time series are then cross-correlated while shifting the time-phase relationship thereof with respect to the time-phase relationship of the transmitted signal and the composite detected signal, the improvement which comprises:

producing said vibratory signal in the form of a signal having a characteristic adapted to vary between two magnitudes; and varying said characteristic between said two magnitudes according to a binary code until the amplitude density sprectrum of the vibratory signal is given by the relationship $\sin X/X$, where X is frequency.

6. In a method for determining the travel time of a signal between a transmitting location and a detecting location spaced apart at the earth's surface wherein there is transmitted from the transmitting location a vibratory transmitted signal made up of a succession of energy pulses which, after propagation over a plurality of paths, is detected as a composite signal at the detecting location, which transmitted signal is nonrepetitive during a time interval which is at least as long as the travel time of said signal along any of said paths by which it reaches the detecting location at usable energy levels and wherein there are produced a time series representative of said transmitted signal and a time series representative of the composite signal detected at the detecting location, and the time series are then cross-correlated while shifting the time-phase relationship thereof with respect to the time-phase relationship of the transmitted signal and the composite detected signal, the improvement which comprises:

varying a characteristic of the vibratory signal until the amplitude density spectrum thereof is substantially given by the relationship $\sin X/X$, where X is frequency.

7. In a method for determining the travel time of a signal between a transmitting location and a detecting location spaced apart at the earth's surface wherein there is transmitted from the transmitting location a vibratory transmitted signal made up of a succession of energy pulses which, after propagation over a plurality of paths, is detected as a composite signal at the detecting location, which transmitted signal is nonrepetitive during a time interval which is at least as long as the travel time of said signal along any of said paths by which it reaches the detecting location at usable energy levels and wherein there are produced a time series representative of said transmitted signal and a time series representative of the composite signal detected at the detecting location, and the time series are then cross-correlated while shifting the time-phase relationship thereof with respect to the time-phase relationship of the transmitted signal and the composite detected signal, the improvement which comprises:

varying the amplitude of said vibratory signal in accordance with a shift register binary code of maximal length having a time duration of sufficient length so that the transmitted vibratory signal is nonrepetitive during a time interval which is at least as long as the travel time of the vibratory signal along any of the paths by which it reaches the detecting location at usable energy levels.

8. In a method for determining the travel time of a signal between a transmitting location and a detecting location spaced apart at the earth's surface wherein there is transmitted from the transmitting location a vibratory transmitted signal made up of a succession of energy pulses which, after propagation over a plurality of paths, is detected as a composite signal at the detecting location, which transmitted signal is nonrepetitive during a time interval which is at least as long as the travel time of said signal along any of said paths by which it reaches the detecting location at usable energy levels and wherein there are produced a time series representative of said transmitted signal and a time series representative of the composite signal detected at the detecting location, and the time series are then cross-correlated while shifting the time-phase relationship thereof with respect to the time-phase relationship of the transmitted signal and the composite detected signal, the improvement which comprises:

producing a shift register binary code of maximal length; and varying the phase of the vibratory signal between first and second phase relationships while keeping the frequency of the vibratory signal constant, the signal being varied in accordance with the shift register binary code of maximal length so that the transmitted signal is nonrepetitive during a time interval which is substantially longer than the travel time of the vibratory signal along any of the paths by which it reaches the detecting location at usable energy levels.

9. Apparatus for seismic prospecting comprising:

first means for transmitting a vibratory seismic signal into the earth at a first location;

second means at said first location for producing a first electrical signal indicative of the vibratory seismic signal transmitted into the earth;

third means at a second location spaced from said first location, adapted to detect as a second electrical signal the seismic signal produced by said first means and transmitted to said second location over a plurality of signal transmission paths through the earth;

fourth means electrically connected to said second means and to said third means for recording said first and second electrical signals, and for reproducing said first and second electrical signals while shifting the time relationship therebetween with respect to their time relationship as originally recorded;

correlating means in circuit relationship with said fourth means for producing an output signal indicative of the correlation between the reproduced signals from said fourth means as the time relationship therebetween is varied; and means in circuit relationship with said first means for varying a characteristic of said vibratory seismic signal in accordance with a shift register binary code of maximal length having a time duration at least equal to the travel time of seismic waves from said first location to said second location via the deepest seismic wave reflecting horizon of interest.

10. In a method for seismic prospecting wherein there is transmitted into the earth at a first location a vibratory seismic signal which, after propagation over a plurality of paths, is detected to form a composite electrical signal at a detecting location spaced at a distance from said first location, the improvement which comprises:

producing a code sequence which may be represented as a reference time series having a unique auto-correlation function comprising a single major lobe having no side lobes of greater amplitude than the side lobes of the auto-correlation function of statistically unrelated noise components of the composite signal detected at said detecting location;

varying a characteristic of said vibratory seismic signal in accordance with said code sequence so that said vibratory seismic signal is nonrepetitive during a time interval which is at least as long as the travel time of said vibratory seismic signal along any of said paths;

forming an electrical signal representative of said vibratory seismic signal; and electrically cross-correlating said electrical signal representative of said vibratory seismic signal with said composite electrical signal at each of a plurality of time-phase relationships therebetween.

11. In a method for seismic prospecting wherein there is transmitted into the earth at a first location a vibratory seismic signal which, after propagation over a plurality of paths, is detected to form a composite electrical signal at a detecting location spaced at a distance from said first location, the improvement which comprises:

producing a shift register binary code of maximal length;

varying a characteristic of said vibratory seismic signal in accordance with said shift register binary code of maximal length so that said vibratory seismic signal is nonrepetitive during a time interval which is at least as long as the travel time of said vibratory seismic signal along any of said paths;

forming an electrical signal representative of said vibratory seismic signal; and electrically cross-correlating said electrical signal representative of said vibratory seismic signal with said composite electrical signal at each of a plurality of time-phase relationships therebetween.

12. In a method for seismic prospecting wherein there is transmitted into the earth at a first location a vibratory seismic signal which, after propagation over a plurality of paths, is detected to form a composite electrical signal at a detecting location spaced at a distance from said first location, the improvement which comprises:

forming a reference electrical signal representative of a binary code sequence such that the reference electrical signal has an amplitude density spectrum given by the relationship Sin $X/X$, where $X$ is frequency;

converting said reference electrical signal to a seismic signal to form said vibratory seismic signal so that said vibratory seismic signal is nonrepetitive during a time interval which is at least as long as the travel time of said vibratory seismic signal along any of said paths;

forming an electrical signal representative of said vibratory seismic signal; and electrically cross-correlating said electrical signal representative of said vibratory seismic signal with said composite electrical signal at each of a plurality of time-phase relationships therebetween.

13. In a method for seismic prospecting wherein there is transmitted into the earth at a first location a vibratory seismic signal which, after propagation over a plurality of paths, is detected to form a composite electrical signal at a detecting location spaced at a distance from said first location, the improvement which comprises:

producing a shift register binary code of maximal length;

varying a characteristic of said vibratory seismic signal between first and second values of said characteristic in accordance with said shift register binary code of maximal length so that the transmitted signal is nonrepetitive during a time interval which is substantially longer than the travel time of said vibratory seismic signal along any of the paths by which it reaches the detecting location at usable energy levels;

forming an electrical signal representative of said vibratory seismic signal; and electrically cross-correlating said electrical signal representative of said vibratory seismic signal with said composite electrical signal at each of a plurality of time-phase relationships therebetween.

14. In a method for seismic prospecting wherein there is transmitted into the earth at a first location a vibratory seismic signal which, after propagation over a plurality of paths, is detected to form a composite electrical signal at a detecting location spaced at a distance from said first location, the improvement which comprises:

producing a shift register binary code of maximal length;

varying the phase of said vibratory seismic signal between first and second phase relationships while keeping the frequency of said vibratory seismic signal constant, the signal being varied in accordance with the shift register binary code of maximal length so that said vibratory seismic signal is nonrepetitive during a time interval which is substantially longer than the travel time thereof along any of the paths by which it reaches the detecting location at usable energy levels;

forming an electrical signal representative of said vibratory seismic signal; and electrically cross-correlating said electrical signal representative of said vibratory seismic signal with the composite electrical signal at each of a plurality of time-phase relationships therebetween.

15. In a method for seismic prospecting wherein there is transmitted into the earth at a first location a vibratory seismic signal which, after propagation over a plurality of paths, is detected to form a composite electrical signal at a detecting location spaced at a distance from said first location, the improvement which comprises:

producing a code sequence which may be represented as a reference time series having a unique auto-correlation function comprising a single major lobe having no side lobes of greater amplitude than the side lobes of the auto-correlation function of statistically unrelated noise components of the composite signal detected at said detecting location;

producing a reference electrical signal having a characteristic variable between two conditions in accordance with said code sequence;

driving an electro-acoustic transducer with said electrical signal to produce said vibratory seismic signal so that it is nonrepetitive during a time interval which is at least as long as the travel time of said vibratory seismic signal along any of said paths;

recording said composite electrical signal in reproducible form;

repetitively reproducing said reference electrical signal;

repetitively reproducing said composite electrical signal and repetitively electrically cross-correlating said repetitively reproduced reference electrical signal with said repetitively reproduced composite electrical signal at each of a plurality of time-phase relationships therebetween.

16. The method of claim 15 wherein the reference electrical signal is formed in accordance with a binary code sequence such that the reference electrical signal has an amplitude density spectrum given by the relationship Sin $X/X$, where X is frequency.

17. The method of claim 15 wherein the reference signal is formed in accordance with a binary code of maximal length.

References Cited by the Examiner

UNITED STATES PATENTS

| | | | |
|---|---|---|---|
| 2,808,577 | 10/1957 | Crawford et al. | 340—15.5 |
| 2,989,726 | 6/1961 | Crawford et al. | 340—15.5 |
| 3,090,953 | 5/1963 | Frank | 340—3 |
| 3,182,743 | 5/1965 | McCollum | 181—.5 |
| 3,209,322 | 9/1965 | Doty | 340—15.5 |

FOREIGN PATENTS 1,299,570  6/1962  France.

BENJAMIN A. BORCHELT, *Primary Examiner.*

R. M. SKOLNIK, *Assistant Examiner.*